(12) United States Patent
Loofbourrow

(10) Patent No.: US 7,756,877 B2
(45) Date of Patent: Jul. 13, 2010

(54) INDEX COMPRESSION

(75) Inventor: Wayne Loofbourrow, San Jose, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 11/499,031

(22) Filed: Aug. 4, 2006

(65) Prior Publication Data
US 2008/0040307 A1  Feb. 14, 2008

(51) Int. Cl.
G06F 17/30   (2006.01)
(52) U.S. Cl. .................. 707/741; 707/745; 707/748; 707/742
(58) Field of Classification Search .............. 707/742, 707/745, 748, 741
See application file for complete search history.

(56) References Cited

U.S. PATENT DOCUMENTS 5,923,376 A * 7/1999 Pullen et al. ........... 375/240.16
6,859,808 B1 * 2/2005 Chong et al. ............... 707/101
7,149,748 B1 * 12/2006 Stephan ...................... 707/102
2007/0073668 A1 * 3/2007 Stephan ......................... 707/3

OTHER PUBLICATIONS

Wu, Kesheng et al. An Efficient Compression Scheme for Bitmap Indices. 2004 Lawrence Berkely National Laboratory.*

* cited by examiner

Primary Examiner—Don Wong
Assistant Examiner—Tuan-Khanh Phan
(74) Attorney, Agent, or Firm—Blakely, Sokoloff, Taylor & Zafman LLP

(57) ABSTRACT

Systems and methods for compressing an index are described. In one exemplary method, the results of a search are annotated and then encoded into one or more chunks of compressed data in accordance with the annotations of the results. The annotations include an indication of a best encoding method selected from a set of available encoding methods, and an indication of whether to switch to a new chunk during encoding or to continue encoding in the current chunk. Other methods are described and data processing systems and machine readable media are also described.

9 Claims, 12 Drawing Sheets

INDEX COMPRESSION

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching not only the content of a file, but also by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. This search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. Some file management systems, such as the Finder program, allow users to find a file by searching through the metadata.

In a typical system, the results of a search are saved in a list that is commonly referred to as an inverted index. For example, an inverted index might contain a list of references to documents in which a particular word appears. Given the large numbers of words and documents in which the words may appear, an inverted index can be extremely large. Therefore, one of the many challenges presented in performing searches efficiently is managing the size of the inverted index to improve performance. Certain presently existing techniques to manage the size of the inverted index include compressing the index, but the compression is insufficient to achieve the desired performance improvements.

SUMMARY OF THE DESCRIPTION

Methods and systems for compressing an index in a data processing system are described herein.

A method of compressing an index in one exemplary embodiment includes first annotating and then encoding a list, commonly referred to as a postings list, in accordance with the annotation. The postings list identifies items containing a particular search term. The list is a type of inverted index that maps a term, such as a search term, to the identified items. Each item is identified using a unique identifier, referred to herein as an ITEMID. The ITEMID is numeric, and the items are typically listed in the postings list in descending numeric order by ITEMID.

According to one aspect of the invention, the ITEMIDs in the list are encoded into a series of chunks comprising the compressed postings list. A chunk refers to a portion of the compressed postings list that contains one or more ITEMIDs encoded using a particular one of an available encoding method. Available encoding methods may include any encoding method that is capable of reducing the amount of space required to store an ITEMID, such as bitmap, include, and exclude encoding methods, among others. The chunk typically includes a header and a trailer that can be used to access the ITEMIDs, such as identifying the number of ITEMIDs encoded in the chunk and the encoding method used.

According to one aspect of the invention, annotating the postings list includes annotating each item in the list with an annotation indicating a best encoding for the item and whether to encode the item in a same or new chunk when encoding the list, i.e., whether to continue encoding as before, or whether to switch to a new chunk using the indicated best encoding method. The annotation may be in the form of bits that indicate the best encoding method and whether to switch for each of the encoding methods. Annotating is typically performed on each item in the posting list in the opposite order in which the items appear, i.e., in ascending numeric order by ITEMID when they appear in the posting list in descending order, and vice versa. In this manner, the annotations aid in encoding the ITEMIDs in the postings list more efficiently than would otherwise be achieved.

According to yet another aspect of the invention, the best encoding for an ITEMID is selected from a set of available encoding methods, depending on which encoding method will encode the item for the lowest cost, i.e., which encoding method will compress the ITEMID into the least amount of space.

According to another aspect of the invention, during encoding, each item in the postings list is encoded into chunks in accordance with the annotation associated with the list. While the annotation is typically performed on the postings list in the opposite order in which the ITEMIDs are listed, i.e., in ascending numeric order by ITEMID, encoding is typically performed in the same order as the ITEMIDs appear, i.e., in descending order by ITEMID. When the ITEMIDs are listed in the postings list in ascending order, then annotation may occur in descending order and encoding may occur in ascending order, as long as the annotating and encoding are done in opposite fashion.

According to yet another aspect of the invention, during annotation, determining which of the available encoding methods is the best encoding method includes tracking certain statistics for the postings list and each of the available encoding methods to be used during encoding. The statistics include, but are not limited to, the total posting count, the minimum ITEMID, the remaining posting count, and the remaining posting cost, each of which will be described in the detailed description below.

According to one other aspect of the invention, the statistics are used during annotation not only to determine the best encoding, but also to determine whether it is beneficial to switch from a current encoding method to a new encoding method during encoding. Determining whether it is beneficial to switch to a new encoding method or to continue encoding items using the current encoding method includes comparing the cost of starting a new chunk to encode an ITEMID using the best encoding method to the cost of continuing to encode an ITEMID in the current chunk using the current encoding method. In some cases, the cost of switching to a new chunk using a new encoding method may not be worthwhile, even if the new encoding method is the best encoding method, due to the cost of ending the chunk and starting a new chunk. The cost of ending the chunk may be fixed or variable, and generally includes the cost of generating any header and trailer information for each chunk.

Other aspects of the present invention include various data processing systems which perform these methods and machine readable media which perform various methods described herein.

BRIEF DESCRIPTION OF THE DRAWINGS

The present invention is illustrated by way of example and not limitation in the figures of the accompanying drawings in which like references indicate similar elements.

DETAILED DESCRIPTION

The embodiments of the present invention will be described with reference to numerous details set forth below, and the accompanying drawings will illustrate the described embodiments. As such, the following description and drawings are illustrative of embodiments of the present invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2006.

Figure 1:
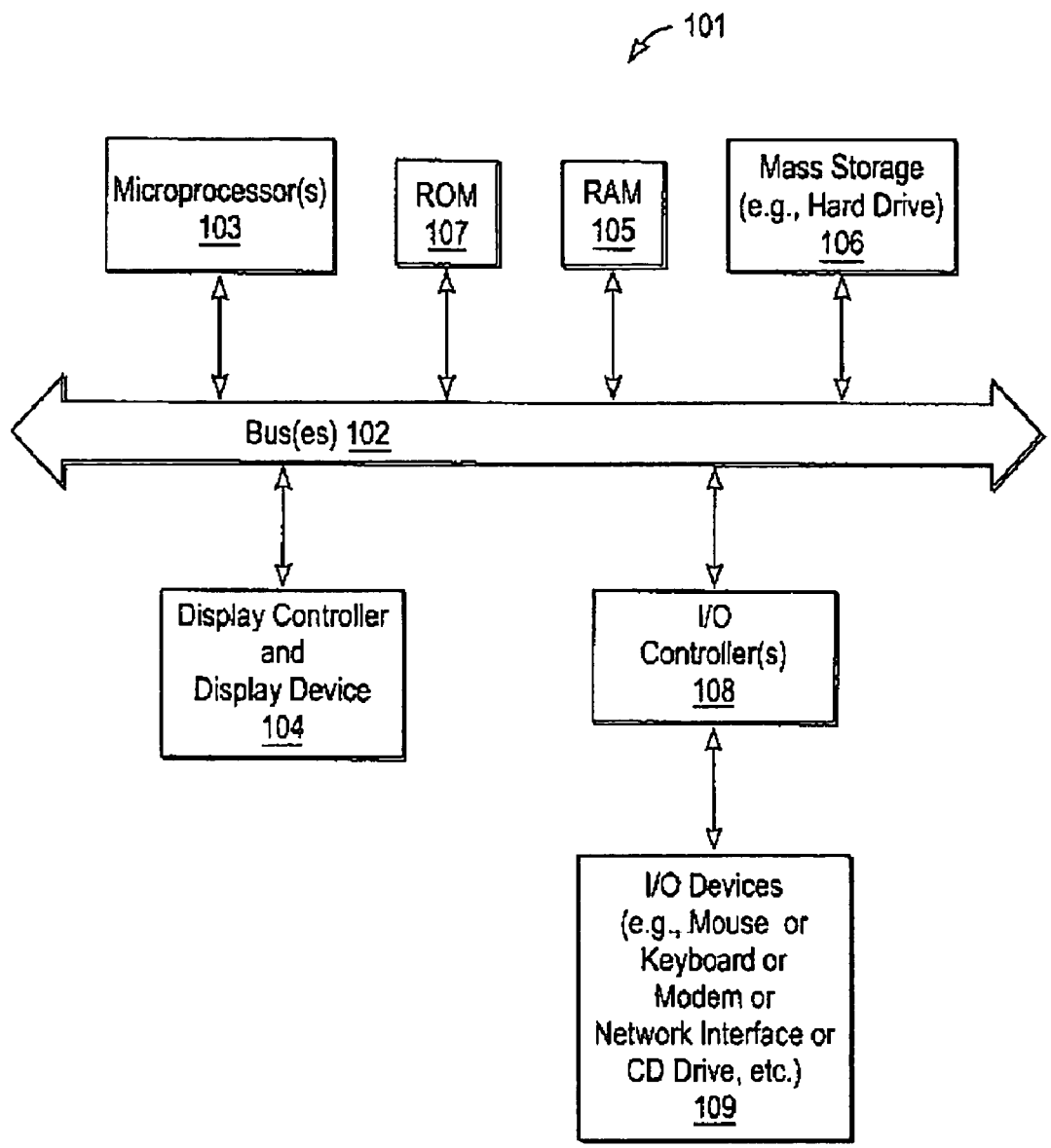
FIG. 1 shows an exemplary embodiment of a data processing system, which may be a general purpose computer system and which may operate in any of the various methods described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be a Macintosh computer from Apple Computer, Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 2:
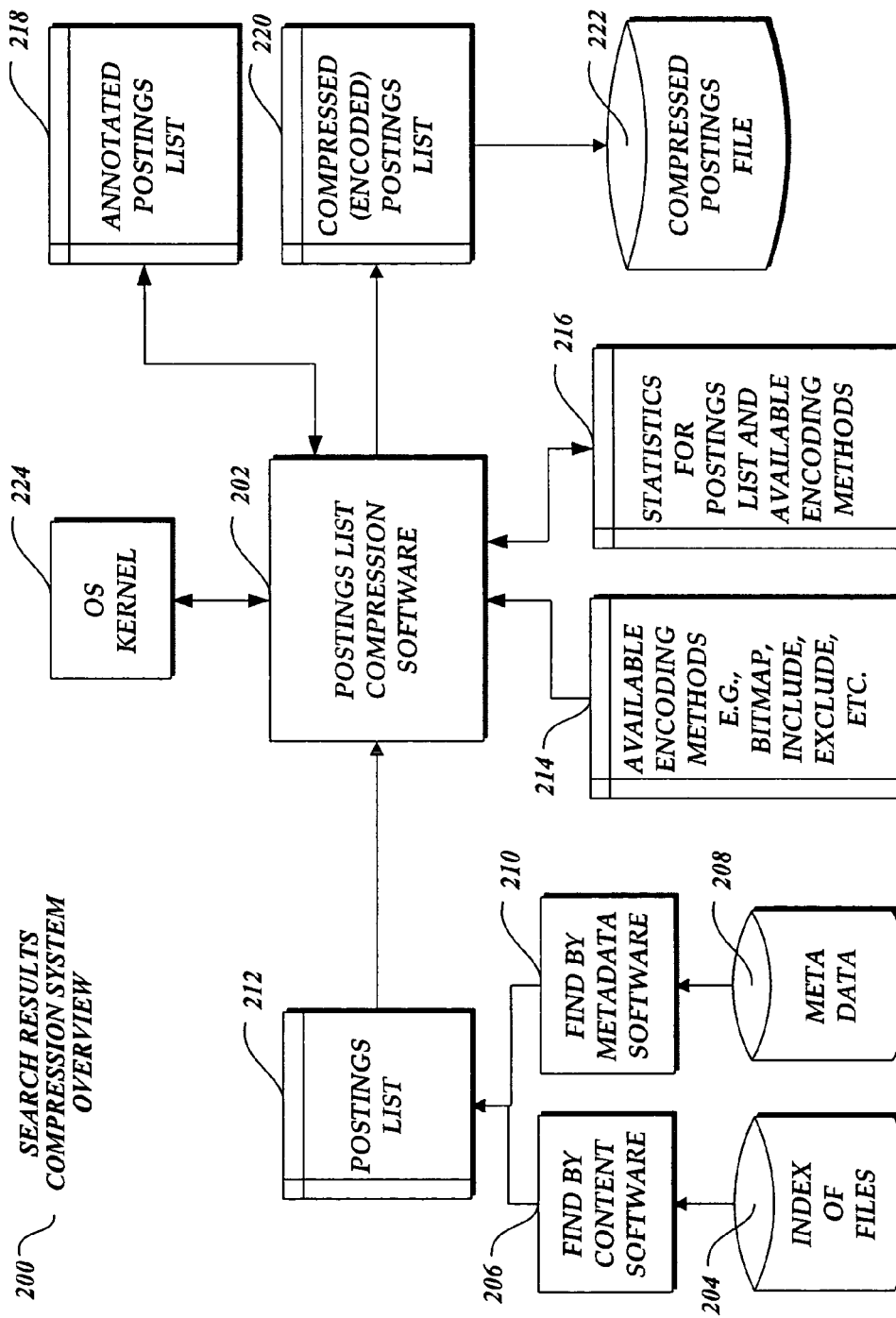
FIG. 2 shows a general example of an architecture for compressing search results according to one exemplary embodiment of the invention.

Various different software architectures may be used to implement the functions and operations described herein. The following discussion provides one example of such an architecture, but it will be understood that alternative architectures may also be employed to achieve the same or similar results. The software architecture shown in FIG. 2 is an example which is based upon the Macintosh operating system. The architecture 400 includes a postings list compression processing software 202 and an operating system (OS) kernel 224 which is operatively coupled to the postings list compression processing software 202 for a notification mechanism which is described below.

The postings list compression processing software 202 is also coupled to other software programs such as find by content software 206 and find by metadata software 210 (which may be the Finder), and other applications not shown. The find by content software 206 and find by metadata software 210 are operatively coupled to databases which includes an index of files 204. The index of files represents at least a subset of the data files in a storage device and may include all of the data files in a particular storage device (or several storage devices), such as the main hard drive of a computer system. The index of files may be a conventional indexed representation of the content of each document. The find by content software 206 searches for words in that content by searching through the database 204 to see if a particular word exists in any of the data files which have been indexed. The find by content software functionality is available through find by metadata software 210 which provides the advantage to the user that the user can search concurrently both the index of files in the database 204 (for the content within a file) as well as the metadata 208 for the various data files being searched. These applications provide the input postings list 212, as generated from searching one or both of the index of files 204 and the metadata database 208, to the postings list compression processing software 202. The postings list compression processing software 202 is also coupled to data that represent the available encoding methods 214 that may be used during encoding, as well as data that represents the statistics accumulated for a given postings list and available encoding methods.

In one exemplary embodiment, the find by content software 206 and/or the find by metadata software 210 is used to find text and other information from word processing or text processing files created by word processing programs such as Microsoft Word, etc. This word processing or text processing files have unique identifiers, referred to as ITEMIDs, that are posted to the postings list 212 when the files contain a desired term, such as the word "Apple." ITEMIDs identifying other types of files, such as image files or music files, may also be posted to the postings list 212.

The software architecture 400 also includes an annotated postings list 218 to contain the annotated version of the postings list 212. This annotated postings list 218 is then used by the posting list compression software to encode the postings list 212 into the compressed (encoded) postings list 220. The software architecture shown in FIG. 2 may be used to perform the methods shown in FIGS. 4A-4E and FIG. 5, or alternative architectures may be used to perform the methods of FIGS. 4A-4E and FIG. 5.

Figure 3A:
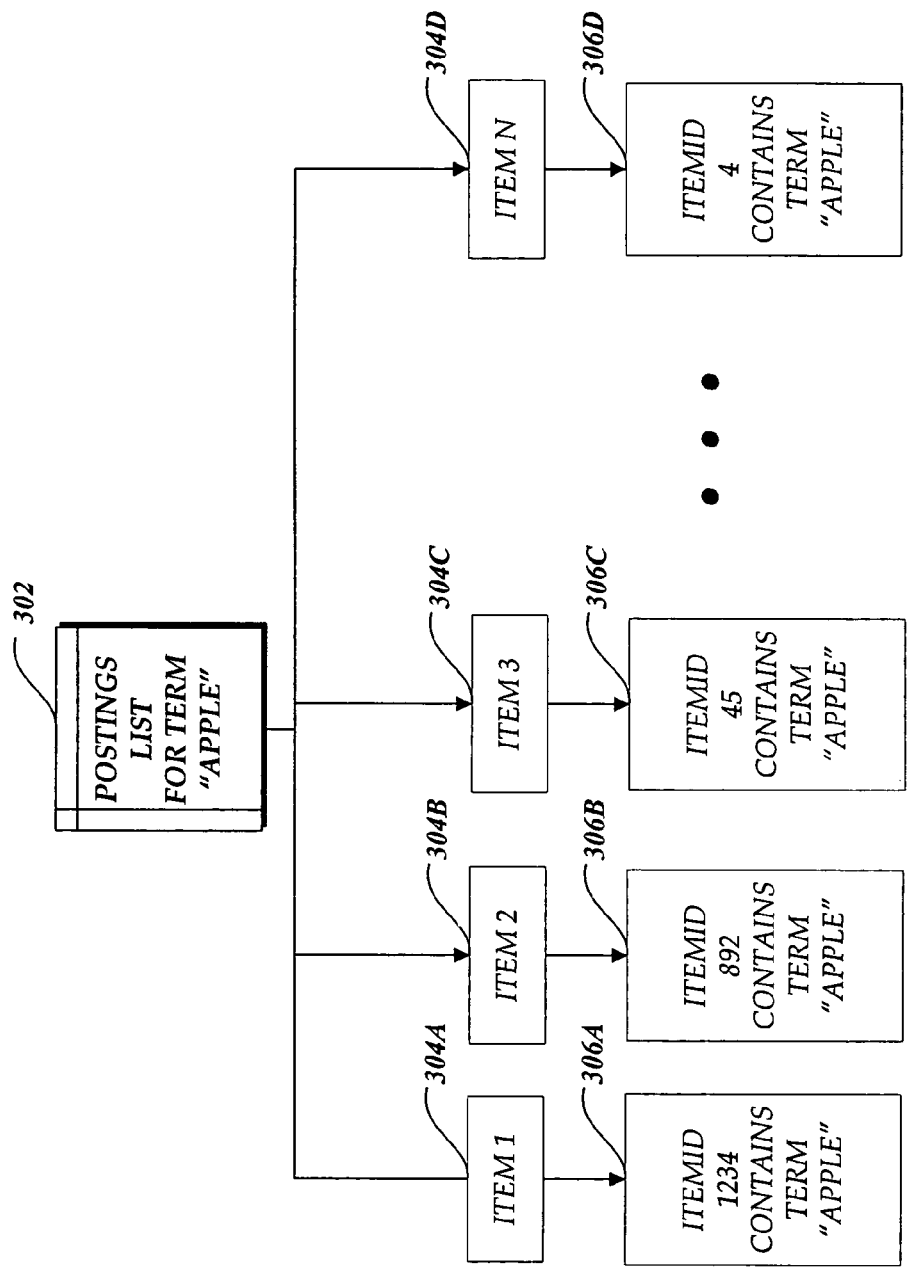
FIG. 3A shows an example of the postings list that may be received for a particular type of file, in this case documents that contain the term "apple."
Figure 3B:
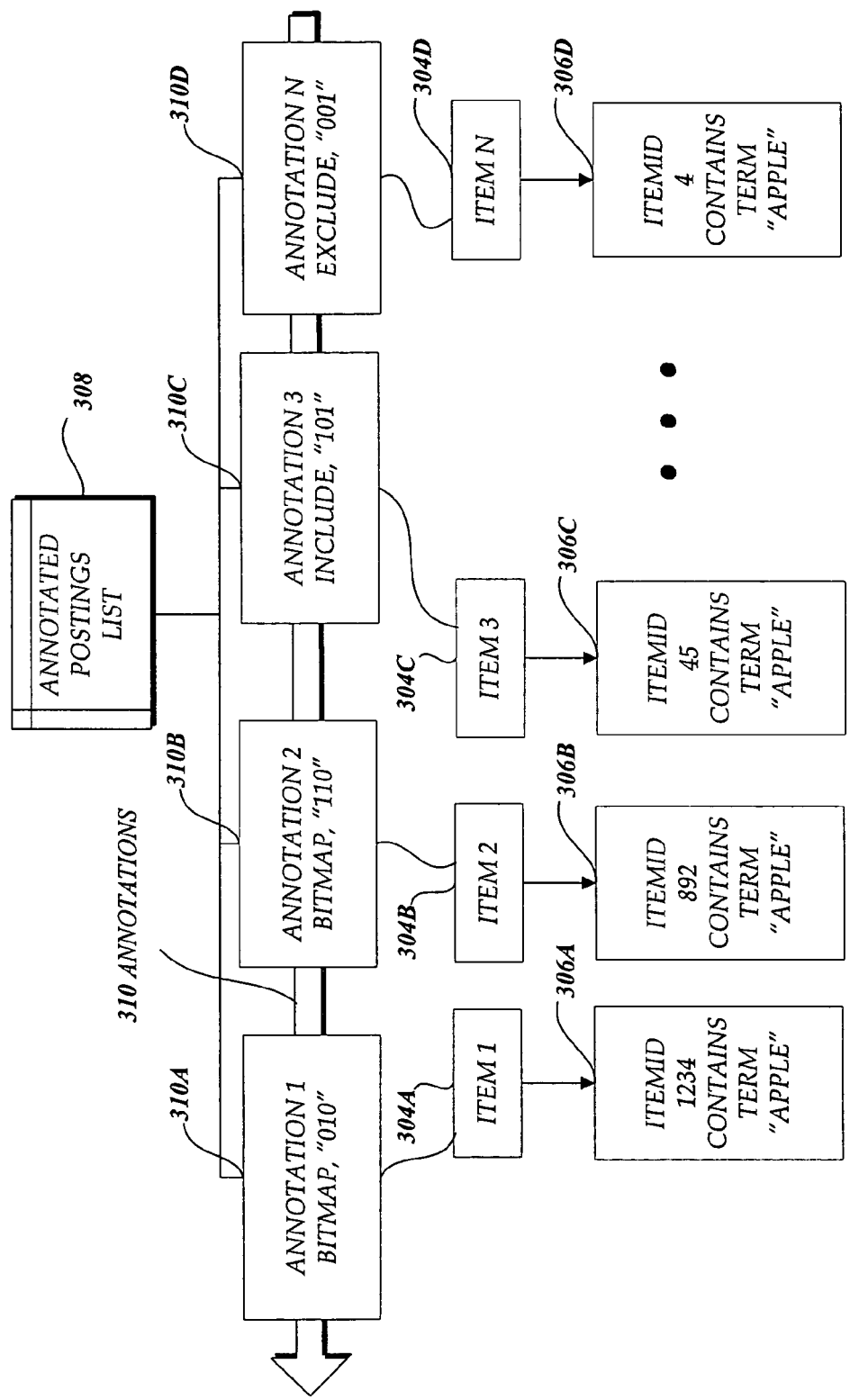
FIG. 3B shows another example of how the postings list may be annotated.
Figure 3C:
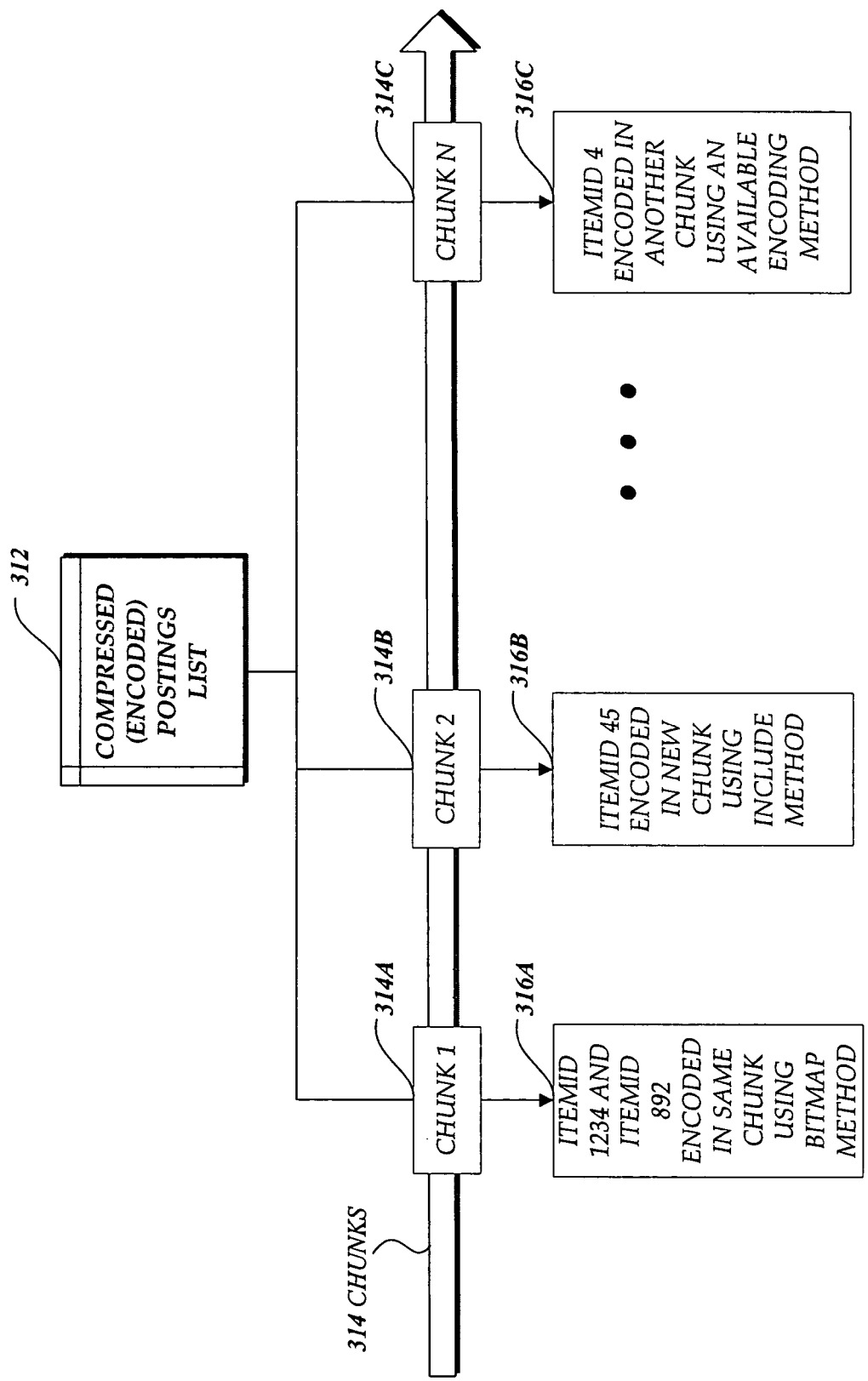
FIG. 3C shows another example of how the postings list may be encoded according to the annotation of the postings list.

FIGS. 3A-3C illustrate an generalized overview of the transformation of an exemplary postings list 302 to an annotated postings list 308, and finally to a compressed, or encoded, postings list 312 using the postings list compression software 202 illustrated in FIG. 2 in accordance with an embodiment of the present invention.

As shown in FIG. 3A, a postings list 302 for the term "Apple" contains "N" entries identifying N items 304, including ITEM 1 04A, ITEM 2 304B, ITEM 3 304C, up to ITEM N 304D. Each item 304 is identified by a unique identifier ITEMID 306, and includes ITEMID "1234" 306A, ITEMID "892" 306B, ITEMID "45" 306C, up to ITEMID "4" 306D. Note that, in this example, the ITEMIDs 306 are listed in descending numerical order by the value of the ITEMID. Of course, postings lists 302 using other orders may be used as long as the ITEMIDs may be accessed in ascending numerical order during annotation and descending numerical order during encoding.

FIG. 3B illustrates the postings list 302 of FIG. 3A after being annotated using the postings list compression software 202 illustrated in FIG. 2 in accordance with an embodiment of the present invention. As shown, the annotated postings list 308 comprises annotations 310 generated in ascending order by ITEMID 306 for each item 304 in the list. The annotations 310 include Annotation 1 310A indicating that the best encoding is the bitmap encoding, and one switch for each of the available encodings indicating whether the encoding method currently in use should be continued to be used in the current chunk, or whether it is beneficial to switch to the indicated best encoding. For example, assuming that the set of available encodings includes, in order, the BITMAP, INCLUDE, and EXCLUDE encodings, the annotation 310A may include switch indicators using the bits "010," with the first bit "0" indicating continue if currently encoding using BITMAP, the second bit "1" indicating switch to the best encoding if currently encoding using INCLUDE, and the third bit "0" indicating continue if currently encoding using EXCLUDE. Similarly, Annotation 2 310B also indicates that the best encoding is the BITMAP encoding, but that the encoding should switch to a new chunk if currently using either the BITMAP or INCLUDE encodings, with bit switches "110." Annotation 3 310C up to Annotation N 310D are similarly formatted, indicating whether to switch to a new chunk using the indicated best encoding method, or to continue encoding the ITEMID in the current chunk using the current encoding method. For example, Annotation 3 310C indicates to switch to a new chunk using the INCLUDE encoding method if currently using either the BITMAP or EXCLUDE encoding methods, indicated with bit switches "101." Annotation N 310D indicates to switch to a new chunk using the EXCLUDE encoding method only if already encoding using the EXCLUDE encoding method, indicated with bit switches "001." The annotations 310 that are shown are by way of example only, and it should be understood that other combinations of switch, continue, and other available encoding methods may be used in the annotations, depending on several factors, including the embodiment of the postings list compression software 202, the available encoding methods, and the values of the ITEMIDs contained in the postings list 302 being annotated.

FIG. 3C illustrates the postings list 302 of FIG. 3A after being compressed using the postings list compression software 202 illustrated in FIG. 2 in accordance with an embodiment of the present invention. As shown, the compressed, or encoded, postings list 312 comprises chunks 314 that contain one or more ITEMIDs 316 that have been encoded using a particular one of the available encoding methods in accordance with the annotations 310 illustrated in FIG. 3B. As shown, the chunks 314 are generated in descending order by ITEMID, here shown as CHUNK N, 314C containing ITEMID 4, 316C, CHUNK 2, 314B, containing ITEMID 45, 316B, and CHUNK 1 containing ITEMIDs 892 and 1234, 316A.

Turning now to FIGS. 4A-4E, methods for implementing an embodiment of the present invention described in the foregoing figures are described in a series of flowcharts. The method 400 to annotate the posting list beginning in FIG. 4A may commence with operation 402 in which statistics for the posting list to be annotated are initialized, including setting the total posting count, i.e., the total number of ITEMIDs in the list, to zero. Initialization continues with a loop M1 404 through the available encoding methods, and an operation 406 for each encoding method M1 to set the minimum ITEMID to the last ITEMID in the posting list being annotated, and to set the remaining posting count and cost that are to be tracked for each available encoding method during annotation to the value zero. Once the initialization operations are complete, the loop M1 is closed 408.

Figure 4A:
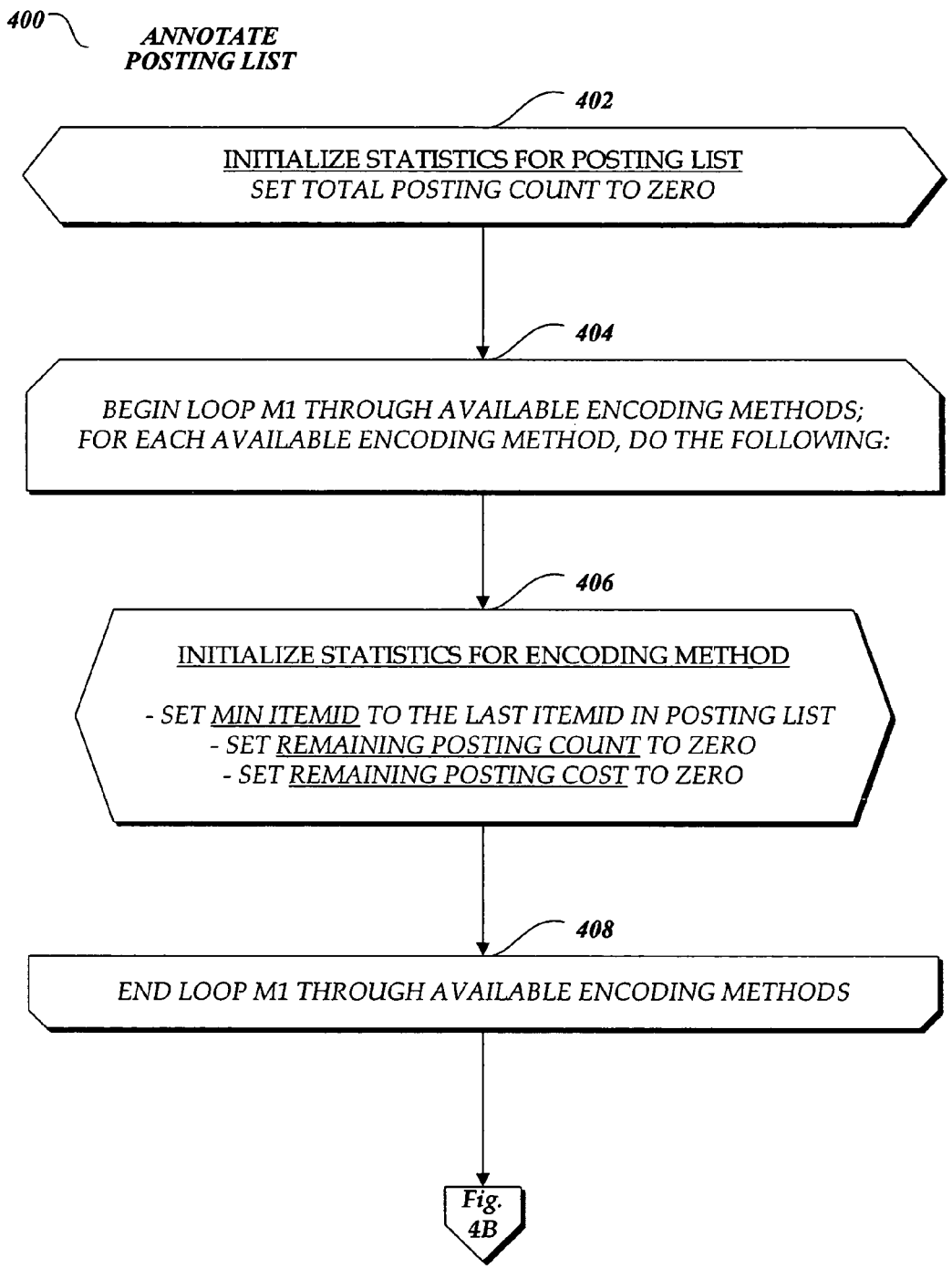
FIGS. 4A-4F is a flowchart showing another exemplary method of annotating the postings list in accordance with an embodiment of the present invention.
Figure 4B:
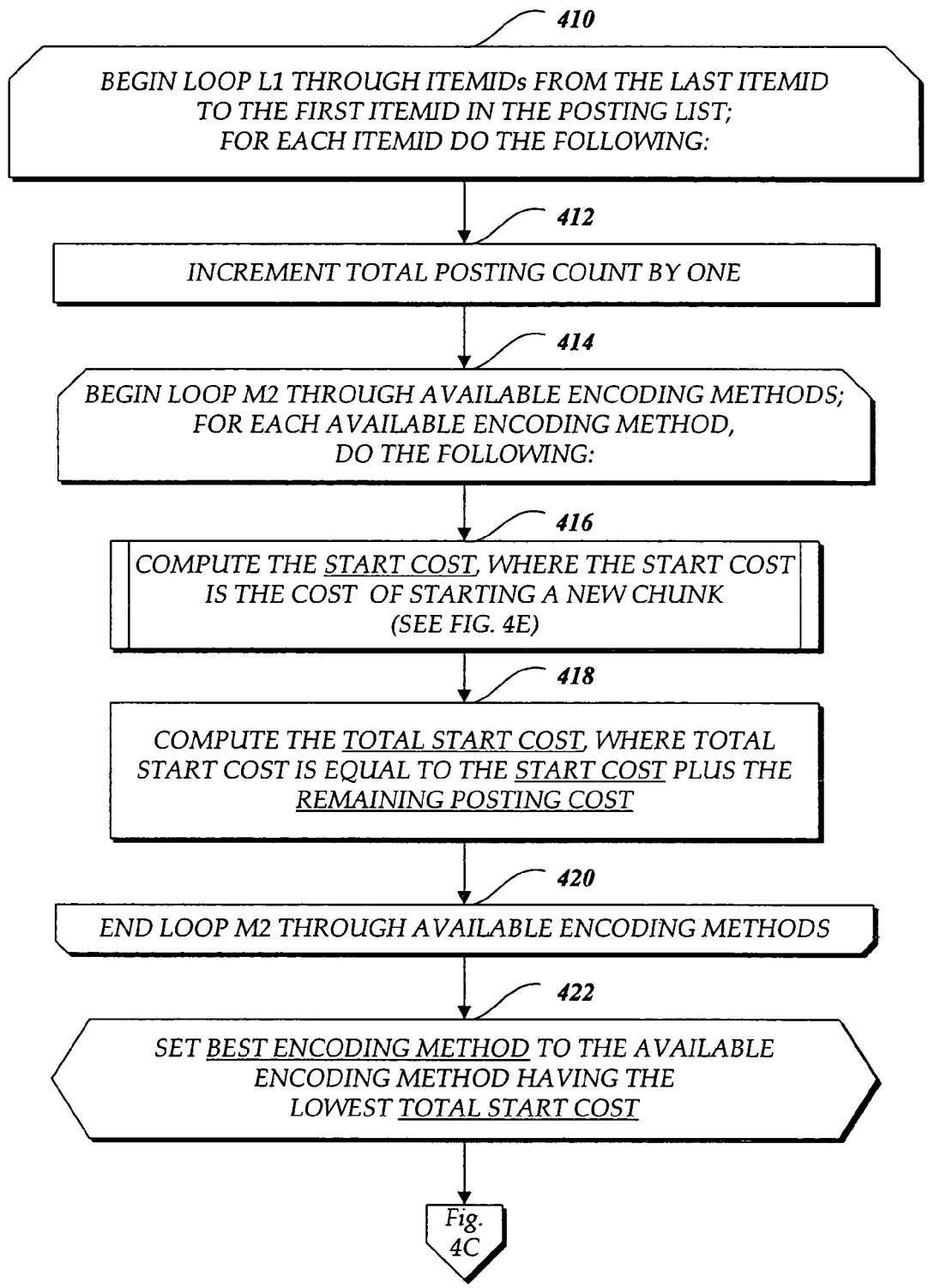

The description of processing for method 400 continues at FIG. 4B, beginning with a loop L1 410 through the ITEMIDs from the last ITEMID in the postings list to the first ITEMID in the posting list so that the ITEMIDs are processed in ascending order by their respective values. As each ITEMID is processed, the method 400 increments the total posting count by one in operation 412, and begins another loop M2 414 through the available encoding methods. For each available encoding method, processing continues at operation 416 to computer the start cost, where the start cost is the cost of starting the encoding of the current ITEMID[L1] in a new chunk. Operation 416 is described in more detail in FIG. 4E.

Once the start cost is computed, processing continues at operation 418 to compute the total start cost, where the total start cost plus the remaining posting cost. For the first ITEMID in Loop L1 410, the remaining posting cost has been initialized to the value zero. For each subsequent ITEMID in Loop L1 410, the remaining posting cost will have been previously computed to be the total start cost for the presently determined best encoding method (see operation 442 in FIG. 4D). Once the total start cost has been computed in operation 418, the loop M2 through the available encoding methods is ended 420, and processing continues in operation 422, where a newly determined best encoding method is set to the available encoding method having the lowest total start cost as determined in operation 418.

Figure 4C:
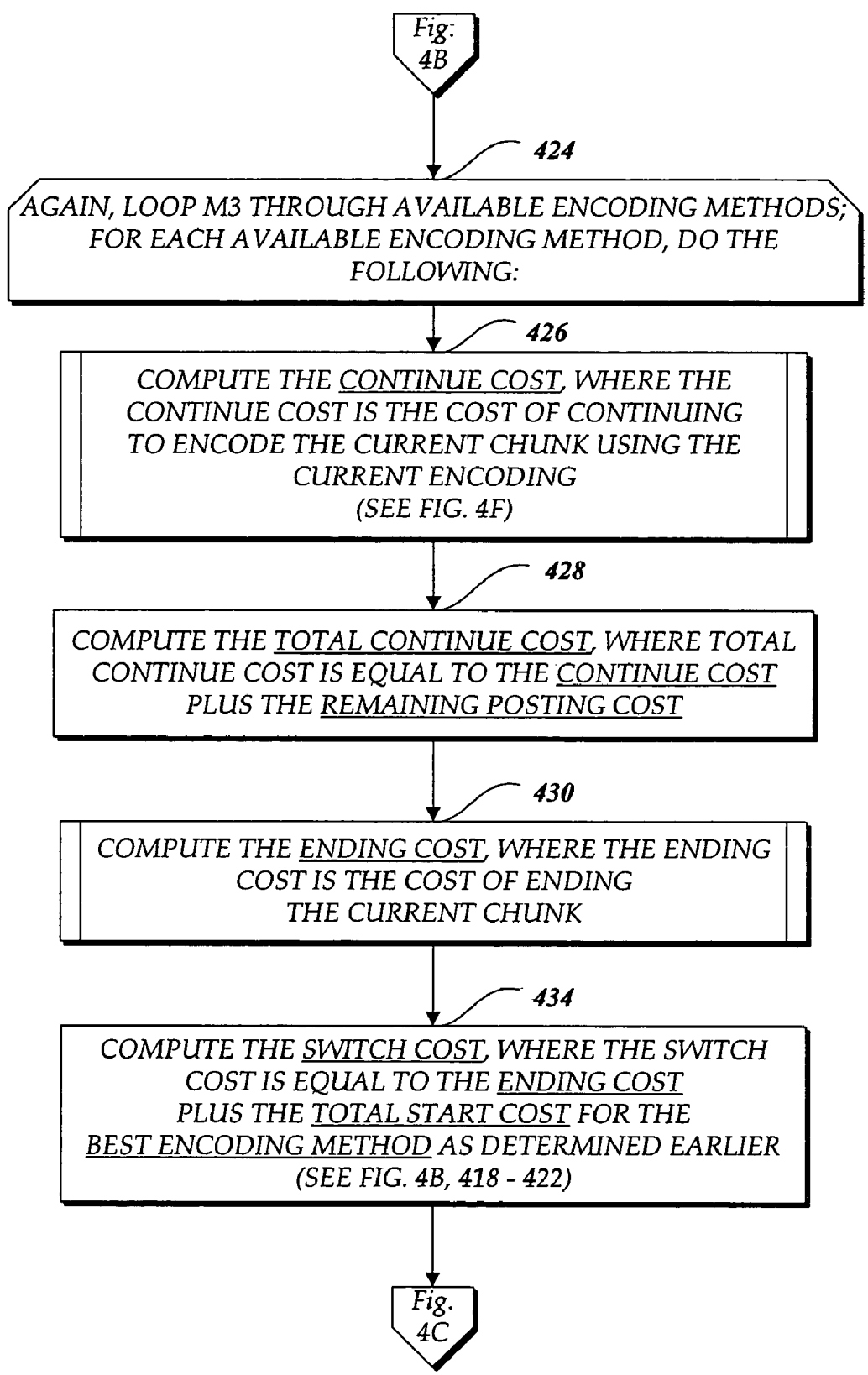

The description of processing for method 400 continues at FIG. 4C, beginning with another loop M3 424 through the available encoding methods. For each available encoding method, processing continues at operation 426 to compute the continue cost, where the continue cost is the cost of continuing to encode the current chunk using the current encoding method. The operation 426 is described in further detail in FIG. 4F.

Once the continue cost is computed, processing continues at operation 428 to compute the total continue cost, where the total continue cost is equal to the continue cost plus the remaining posting cost. Once again, for the first ITEMID in Loop L1 410, the remaining posting cost has been initialized to the value zero. For each subsequent ITEMID in Loop L1 410, the remaining posting cost will have been previously computed to be the total start cost for the presently determined best encoding method (see operation 442 in FIG. 4D). Once the total continue cost has been computed in operation 428, processing continues at operation 430 to compute the ending cost, where the ending cost is the cost of ending the current chunk. The cost of ending the current chunk may be fixed or variable, depending on the current encoding method and other factors. Once the ending cost is computed in operation 430, processing continues at operation 434 to compute the switch cost, where the switch cost is equal to the ending cost plus the total start cost for the best encoding method as determined earlier at operations 418-422 described in FIG. 4B.

Figure 4D:
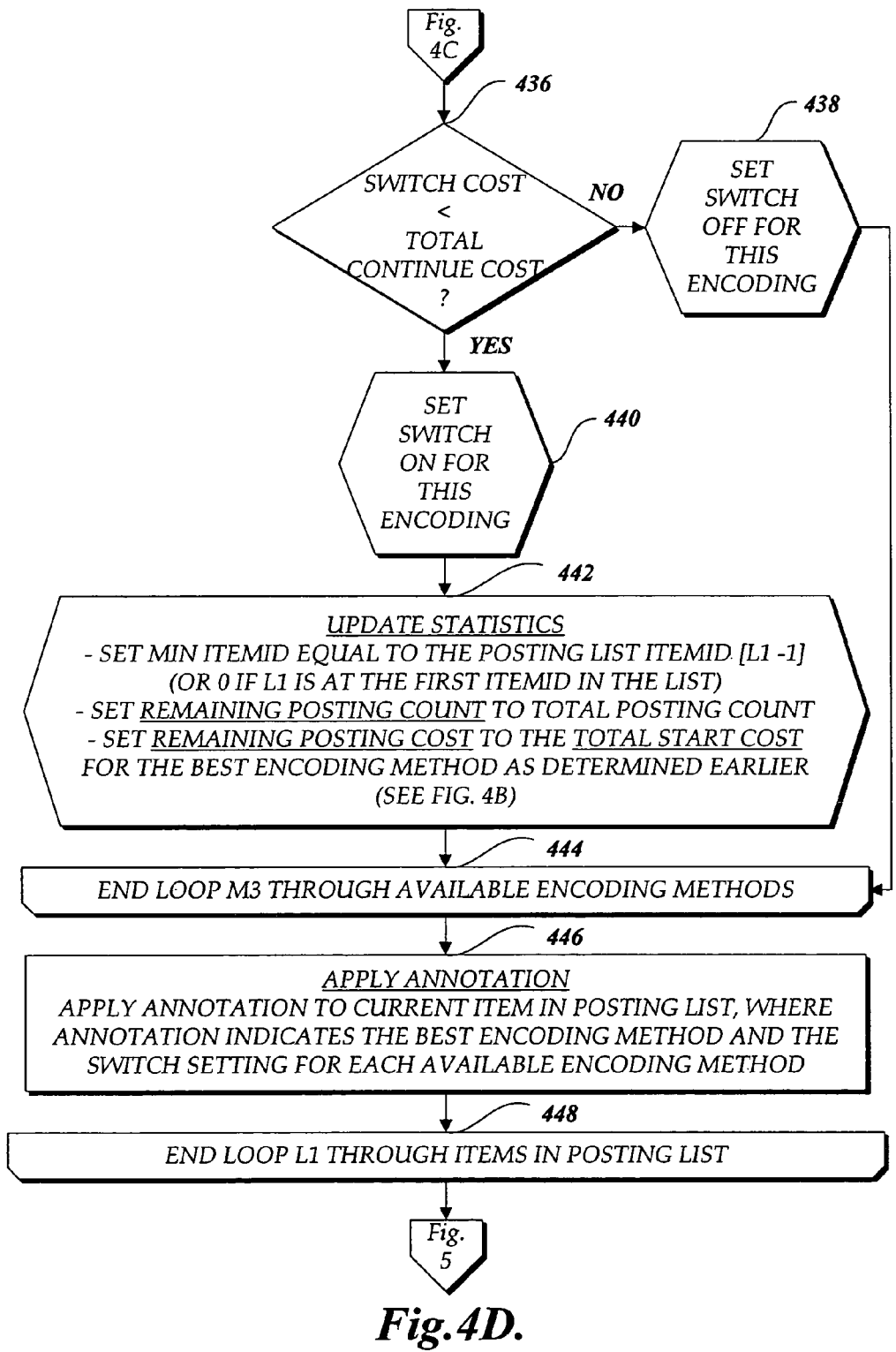
Figure 4E:
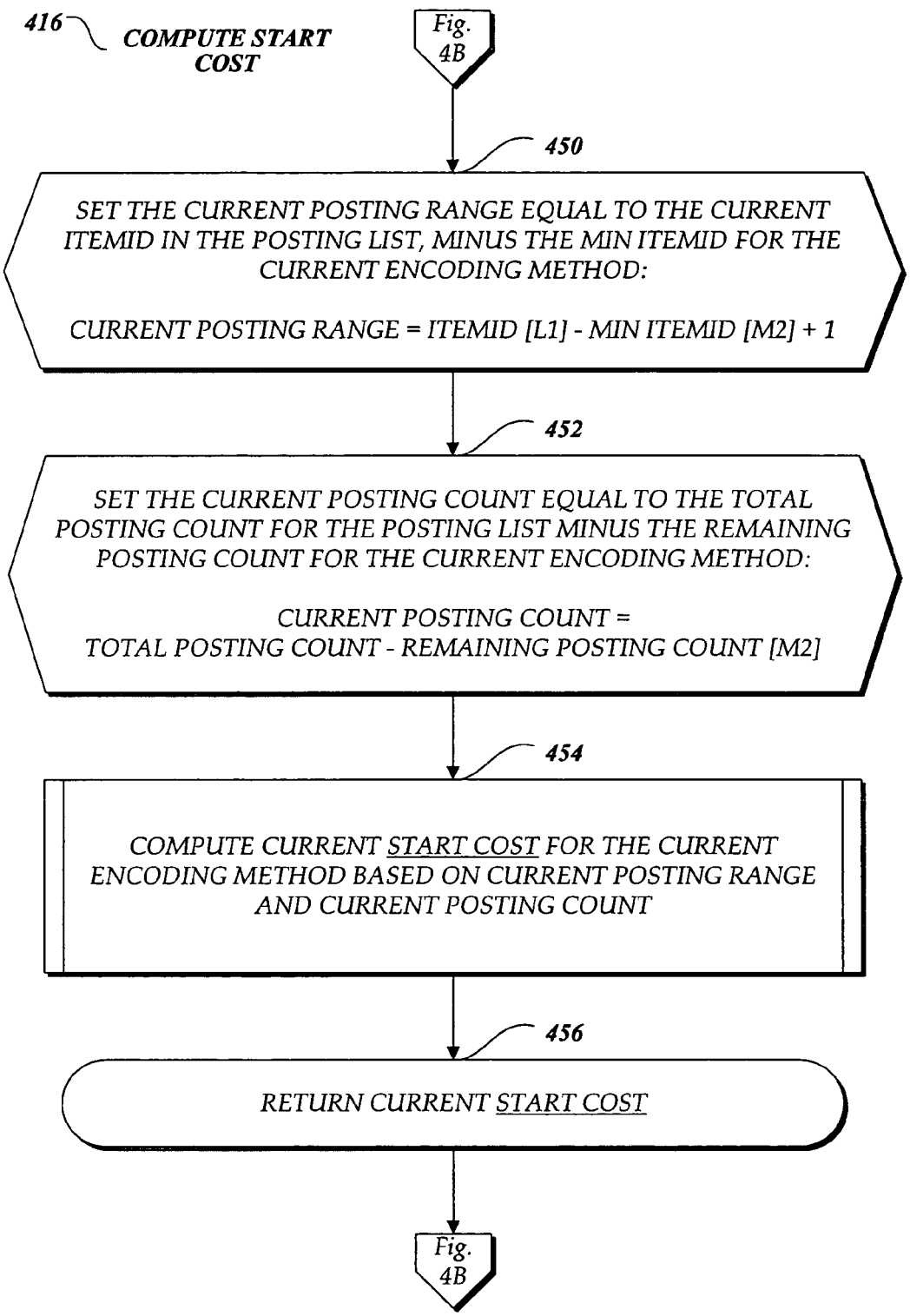
Figure 4F:
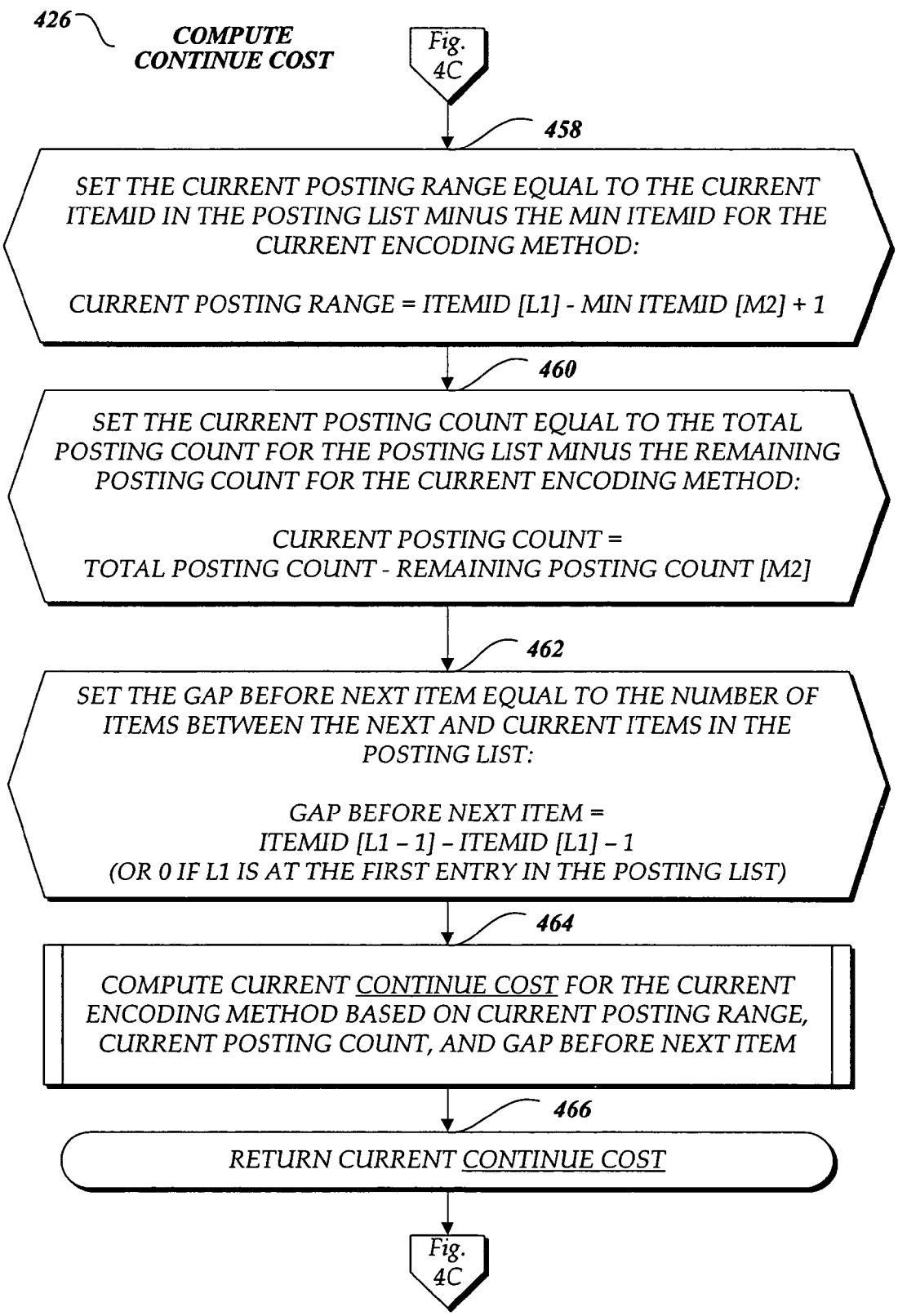

The description of processing for method 400 concludes with FIG. 4D, beginning with a decision operation 436 to determine whether the switch cost is less than the total continue cost. If not, then operation 438 sets the switch off for this encoding [M3], but if so, then operation 440 sets the switch on for this encoding [M3]. When the switch is beneficial, i.e., the switch has been set on at operation 440, then processing continues at operation 442 to update the statistics that are tracked for this encoding method [M3]. For example, the minimum ITEMID is set equal to the previous ITEMID [11−1] (or is set to the value zero if L1 is at the first ITEMID in the list). The remaining posting count is set to the total posting count accumulated in operation 412 in FIG. 4B. The remaining posting cost is set to the total start cost for the newest best encoding method that was determined earlier at operation 422 in FIG. 4B. After the statistics are updated, loop M3 424 through the available encoding methods is ended 444. Now, the annotation can finally be applied to the current ITEMID [L1] in the posting list at operation 446, where the annotation indicates the best encoding method and the switch setting for each available encoding method. Once the annotations have been applied to every ITEMID in the loop L1, the Loop L1 is ended 448, and the process of encoding the posting list can begin as described in FIG. 5.

As noted earlier, FIG. 4E describes operation 416 of computing the start cost in further detail. At operation 450, the current posting range is set equal to the current ITEMID[L1] in the posting list minus the minimum ITEMID for the current encoding method [M2]. As shown in the algorithm in operation 450, a numeric value of 1 is added to the result to yield the range. For example, if the minimum ITEMID for the current encoding method is 4 and the current ITEMID in the posting list is 45, then the current posting range is 42=45−4+1.

Processing continues at operation 452 to set the current posting count equal to the total posting count for the posting list minus the remaining posting count for the current encoding method. For example, if the total posting count is up to 400 items thus far, and the remaining posting count for the current encoding method is 390, then the current posting count is 10, indicating that 10 ITEMIDs would be encoded when starting the next new chunk. At operations 454, the current start cost is computed for the current encoding method based on the current posting range and current posting count. The current start cost is returned to operation 416 in FIG. B, where the method 400 continues processing at operation 418 using the newly computed current start cost.

As noted earlier, FIG. 4F describes operation 426 of computing the continue cost in further detail. Similar to computing the start cost, at operation 458, the current posting range is set equal to the current ITEMID[L1] in the posting list minus the minimum ITEMID for the current encoding method [M2]. As shown in the algorithm in operation 458, a numeric value of 1 is added to the result to yield the range. For example, if the minimum ITEMID for the current encoding method is 4 and the current ITEMID in the posting list is 45, then the current posting range is 42=45−4+1.

Processing continues at operation 460 to set the current posting count equal to the total posting count for the posting list minus the remaining posting count for the current encoding method. For example, if the total posting count is up to 400 items thus far, and the remaining posting count for the current encoding method is 390, then the current posting count is 10, indicating that 10 ITEMIDs would be encoded when starting the next new chunk. At operation 462, the gap in the ITEMIDs between the next and current items in the posting list is computed using the algorithm ITEMID[L1−1]− ITEMID [L1]−1 (or 0 if L1 is at the first entry item in the posting list). All of the values just computed, the current posting range, the current posting count, and the gap between the current and next ITEMIDs in the list are used to compute the current continue cost using the current encoding method [M3] at operation 464. Once computed, the process concludes by returning the continue cost at termination 466 to operation 426 of FIG. 4C.

Figure 5:
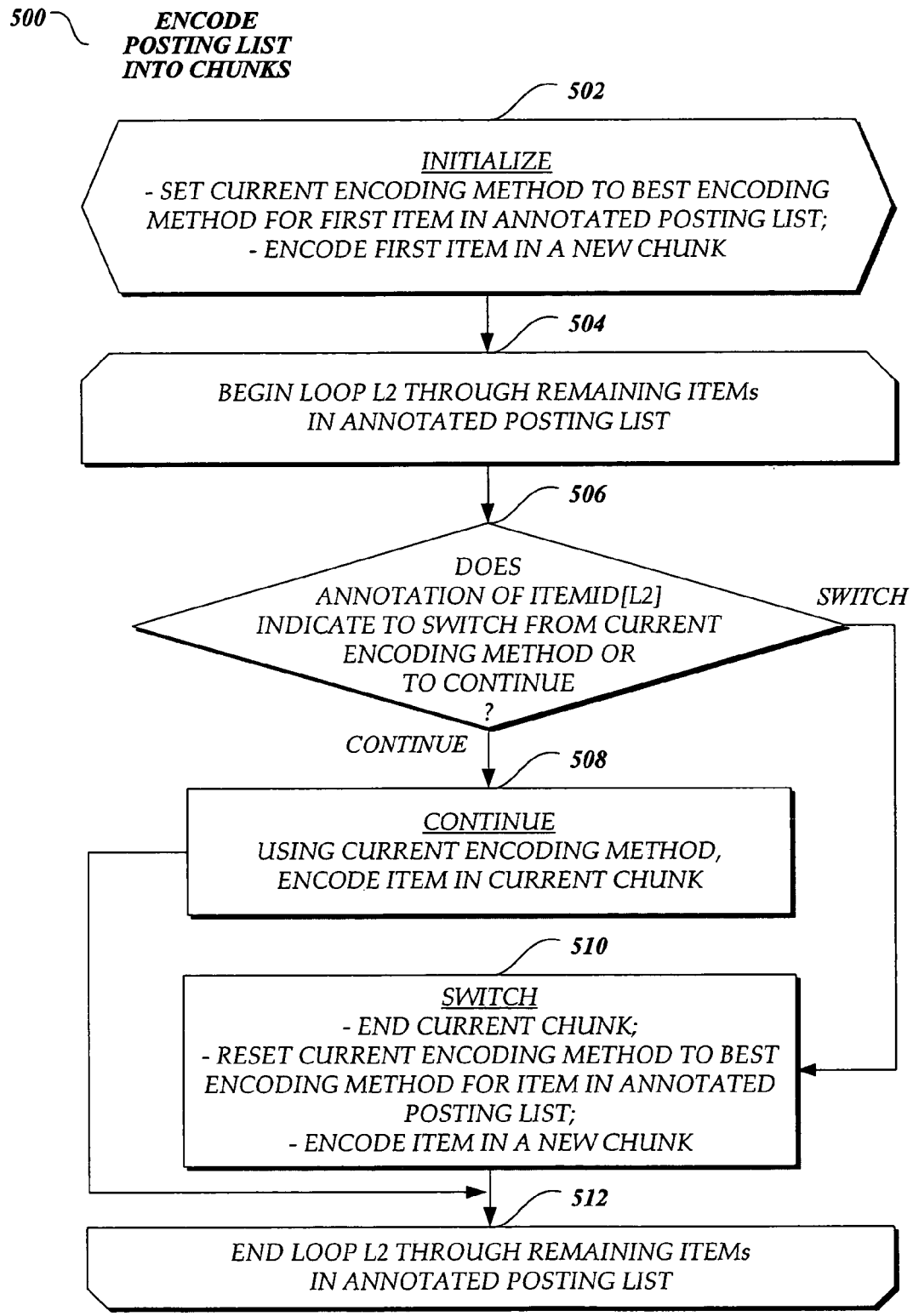
FIG. 5 is a flowchart showing another exemplary method of encoding the postings list in accordance with the annotation of the postings list in accordance with an embodiment of the present invention.

Turning now to FIG. 5, once the method 400 of annotating the posting list is completed, the postings list compression software 202 continues with method 500 to encode the ITEMIDs in the annotated postings list into chunks in accordance with the annotations for each ITEMID. The method 500 begins at operation 502 by initializing values, including setting the current encoding method to the best encoding method annotated for the first ITEMID in the annotated posting list, where the first ITEMID is the one having the highest numeric value in the list. In addition, initialization includes starting a new chunk so that the first ITEMID is encoded in a new chunk.

The method 500 continues by beginning a loop L2 through the remaining ITEMIDs in the annotated posting list in descending numeric order. The first operation in the loop L2 is a decision operation 506 to determine whether the annotation of the current ITEMID[L2] indicate to switch from the current encoding method, or to continue with the current encoding method. If the annotation indicates to switch, then processing continues at operation 510 to end the current chunk. In a typical implementation, this will require generating various trailer information for the current chunk. In addition, operation 510 includes resetting the current encoding method to the best encoding method for the current ITEMID [L1] in the annotated posting list, and encoding the item in a new chunk. In a typical implementation, encoding the item in a new chunk will require generating various header information for the new chunk. In the case where the annotation indicates that it is better to continue with the current encoding method, the method 500 continues at operation 508, in which the ITEMID[L1] is encoded in the current chunk using the current encoding method. Once either operation 508 or 510 is performed as indicated by the appropriate annotations for each ITEMID [L2] in the postings list, the method 500 concludes by ending the loop L2 through the remaining ITEMIDs in the list 512.

In the foregoing specification, the present invention has been described with reference to specific exemplary embodiments. It will be evident that various modifications may be made to the described embodiments without departing from the broader spirit and scope of the invention as set forth in the following claims. For example, the ITEMIDs in the postings list could appear in ascending order initially, instead of descending order as described. All of the operations on the ITEMIDs would therefore occur in the opposite order than described herein to achieve the same beneficial compression of an index. The specification and drawings are, accordingly, to be regarded in an illustrative sense rather than a restrictive sense.

What is claimed is:

1. A machine implemented method of compressing results of a search, the method comprising:

receiving a list identifying items containing a search term, the items being listed in order by each item's unique identifier;

accumulating compression cost statistics for the list, the statistics tracking compression costs associated with available encoding methods for separately compressing each item's unique identifier;

determining a best encoding for each item in the list, wherein the best encoding for an item in the list is an available encoding method that separately compresses the item's unique identifier into a least amount of storage space in a chunk of output based on comparing the compression costs associated with available encoding methods for compressing the item's unique identifier;

annotating each item in the list in a first order by each item's unique identifier with an annotation indicating the best encoding for each of the items; and determining whether to encode each item in the list in a same or new chunk of output based on the best encoding for each of the items, wherein the best encoding for the item is one of a plurality of available encoding methods selected from any of a bitmap encoding method, an include encoding method, and an exclude encoding method.

2. The method of claim 1, further comprising:

encoding each of the items in the list into at least one chunk of output, wherein encoding is performed in a second order opposite to the first order by each item's unique identifier in accordance with the item's annotation indicating the best encoding for the item.

3. The method of claim 1, wherein the items contain the search term in at least one of a content and a metadata associated with the items.

4. A machine readable medium containing executable program instructions for causing a data processing system to perform a method of compressing results of a search, the method comprising:

receiving a list identifying items containing a search term, the items being listed in order by each item's unique identifier;

accumulating compression cost statistics for the list, the statistics tracking compression costs associated with available encoding methods for separately compressing each item's unique identifier;

determining a best encoding for each item in the list, wherein the best encoding for an item in the list is an available encoding method that separately compresses the item's unique identifier into a least amount of storage space in a chunk of output based on comparing the compression costs associated with available encoding methods for compressing the item's unique identifier;

annotating each item in the list in a first order by each item's unique identifier with an annotation indicating the best encoding for each of the items; and determining whether to encode each item in the list in a same or new chunk of output based on the best encoding for each of the items, wherein the best encoding for the item is one of a plurality of available encoding methods selected from any of a bitmap encoding method, an include encoding method, and an exclude encoding method.

5. A machine readable medium as in claim 4, wherein the method further comprises:

encoding each of the items in the list into at least one chunk of output, wherein encoding is performed in a second order opposite to the first order by each item's unique identifier in accordance with the item's annotation indicating the best encoding for the item.

6. A machine readable medium as in claim 4, wherein the items contain the search term in at least one of a content and metadata associated with the items.

7. A data processing system comprising:
- means for receiving a list identifying items containing a search term, the items being listed in order by each item's unique identifier;
- means for accumulating compression cost statistics for the list, the statistics tracking compression costs associated with available encoding methods for separately compressing each item's unique identifier;
- means for determining a best encoding for each item in the list, wherein the best encoding for an item in the list is an available encoding method that separately compresses the item's unique identifier into a least amount of storage space in a chunk of output based on comparing the compression costs associated with available encoding methods for compressing the item's unique identifier;
- means for annotating each item in the list in a first order by each item's unique identifier with an annotation indicating the best encoding for each of the items; and
- means for determining whether to encode each item in the list in a same or new chunk of output based on the annotation indicating the best encoding for each the items, wherein the means for compressing the item's unique identifier into the least amount of storage space in the chunk of output are selected from any of a bitmap encoding means, an include encoding means, and an exclude encoding means.

8. A data processing system as in claim 7, wherein the method further comprises:
- means for encoding each of the items in the list into at least one chunk of output, wherein encoding is performed in a second order opposite to the first order by each item's unique identifier in accordance with the item's annotation indicating the best encoding for the item.

9. A data processing system as in claim 7, wherein the items contain the search term in at least one of a content and metadata associated with the items.

\* \* \* \* \*